United States Patent [19]

Judd

[11] Patent Number: 4,779,135
[45] Date of Patent: Oct. 18, 1988

[54] MULTI-IMAGE COMPOSER

[75] Inventor: Thomas H. Judd, Madison, N.J.

[73] Assignee: Bell Communications Research, Inc., Livingston, N.J.

[21] Appl. No.: 911,777

[22] Filed: Sep. 26, 1986

[51] Int. Cl.$^4$ ...................... H04N 5/272; H04N 5/262
[52] U.S. Cl. .................................... 358/183; 358/180; 358/22
[58] Field of Search .................. 358/183, 22, 182, 180

[56] References Cited

U.S. PATENT DOCUMENTS

| | | | |
|---|---|---|---|
| 4,139,860 | 2/1979 | Micic et al. | 358/183 X |
| 4,200,890 | 4/1980 | Inaba et al. | 358/183 |
| 4,249,213 | 2/1981 | Imaide et al. | 358/183 |
| 4,266,242 | 5/1981 | McCoy | 358/22 |
| 4,278,993 | 7/1981 | Suzuki | 358/183 X |
| 4,282,546 | 8/1981 | Reitmeier | 358/22 |
| 4,302,776 | 11/1981 | Taylor et al. | 358/180 X |
| 4,360,831 | 11/1982 | Kellar | 358/183 X |
| 4,409,618 | 10/1983 | Inaba et al. | 358/183 |
| 4,568,981 | 2/1986 | Beaulier | 358/183 |
| 4,602,286 | 7/1986 | Kellar et al. | 358/22 X |
| 4,636,864 | 1/1987 | Annegarn et al. | 358/183 X |

OTHER PUBLICATIONS

"AT&T's Truevision (TM) Microcomputer Graphics Products", AT&T Electronic Photography and Imaging Center, Indianapolis, Ind.

Primary Examiner—James J. Groody
Assistant Examiner—E. Anne Faris
Attorney, Agent, or Firm—James W. Falk

[57] ABSTRACT

A still frame image processor is disclosed. The still frame image processor comprises two frame memories, either of which can digitize and store a frame of video. A first image, stored in the first memory, can be shrunk by an integer factor M and placed at an arbitrary location in the second memory, so that the first memory is free to capture a second image. A video keying operation combines the outputs, from the two memories to enable the first shrunken image to appear as an inset in the second image so that a new multi-image display is composed.

14 Claims, 7 Drawing Sheets

MULTI-IMAGE COMPOSER

FIELD OF THE INVENTION

The present invention relates to a still frame video image processing system.

BACKGROUND OF THE INVENTION

With the advent of wide bandwidth telecommunications networks, numerous enhanced telecommunications services are expected to become available. Some of these enhanced services will comprise visual browsing systems. Illustratively, in a visual browsing system, a sequence of still images is displayed for a viewer. An example of an enhanced telecommunication service utilizing a visual browsing system is catalogue shopping. Typically, a prospective purchaser will view a sequence of still product images on a monitor and based on these images decide whether to purchase a particular product.

In a visual browsing system, it is desirable to present the viewer with a lot of information (i.e. many images) and to do so quickly, so that the viewer can remember the information and act on it. It is also desirable for the user to be able to compare images and choose among them. Both of these needs suggest the desirability of being able to present more than one image at a time. Preferably, the progress of any browsing session is interactive i.e. it is determined by the user as the session progresses. Accordingly, the contents of any multiple-image displays should not be predetermined. Instead the contents of any multiple-image displays should be composed in real time under the control of the viewer.

A still image video processing system should perform three basic operations to provide user-composed multiple still image displays (1) Shrink: reduce a full size video image in size by a factor M.

(2) Place: position the reduced image at a desired location (x,y) in a new video frame.

(3) Compose: Create a new image comprising appropriately placed smaller images, or alternatively display a relatively small image as an inset in a larger full size image.

Preferably, the composed images should retain true color (i.e. be digitized at 15 to 24 bits per pixel) as opposed to the typical computer graphics color image (1 to 8 bits per pixel). As indicated above, the composing operation should occur in near real time. This means that any single shrink and place operation is desirably completed in about one second or less. It is also desirable for the multiple still image video processing system to be compatible with 525 line 30 sec/frame video, so that a single display device could display sequences of still images as well as full motion sequences. Lastly, it is desirable for a multiple still image composing system to have a computer interface rather than a human interface to enable incorporation of the multiple image composing system into an interactive video applications system including video sources, video displays, and graphics overlay generators.

Commercially available devices generally do not meet the foregoing criteria. Low cost devices based on microprocessors (e.g. the Truevision product line from AT&T) are either too slow or do not provide true color operation. The video special effects generators commonly used by the broadcast TV industry can shrink and place full motion sequence images. However, such devices are generally not applicable for composing multiple still image displays. In addition, the special effects generators used in the TV industry typically have interfaces designed for human interaction with a trained artist and are not suitable for integration into an interactive video applications system to implement an application such as video browsing.

In view of the foregoing, it is an object of the present invention to provide a still frame image processing system capable of composing multiple still image displays in accordance with the criteria discussed above. Thus, it is an object of the invention to provide a system that permits the near real time composition of multiple still image displays comprising one or more reduced size still images interactively selected by the system user.

SUMMARY OF THE INVENTION

The present invention is a still image video processing system. It is capable of combining in near real time at least two still images to compose a multi-image display.

The system of the present invention grabs one frame (i.e. one image) of analog video, digitizes the frame, and stores it in its main memory. This frame may be shrunk by an integer factor M. Shrinking is accomplished by selecting every Mth pixel from the original image and taking a weighted average of the pixels in a two dimensional neighborhood surrounding each selected pixel. (This averaging is equivalent to low pass filtering in the spatial frequency domain. It reduces the high frequency content to prevent aliasing in the shrunken image). The subsampled and averaged pixels are then placed at designated positions in a second memory which serves as an inset memory. When all of the selected pixels have been placed in the inset memory, the main memory becomes available to capture a new image. A video keying operation combines the outputs from the two memories to make the shrunken image stored in the inset memory appear as an inset at a desired location in the main image stored in main memory, thus composing a multi-image display. Alternatively, a sequence of full size images stored in the main memory may be reduced in size and stored at particular locations in the second memory to compose a multi-image display comprising a plurality of reduced size images.

Thus, the still image processing system of the present invention enables the composition of multi-image displays comprising one or more reduced size still images, interactively selected in near real time by the system user.

DETAILED DESCRIPTION

The present invention is a still frame image processing system. It is capable of composing multi-image displays comprising two or more still frame images which are combined to form a new image. Before describing the architecture of the image processing system, it will be useful to discuss a method for shrinking an image stored in one memory and placing the resulting reduced size image at a designated location in a second memory. This shrink and place method may be understood with the aid of FIG. 1.

Figure 1:
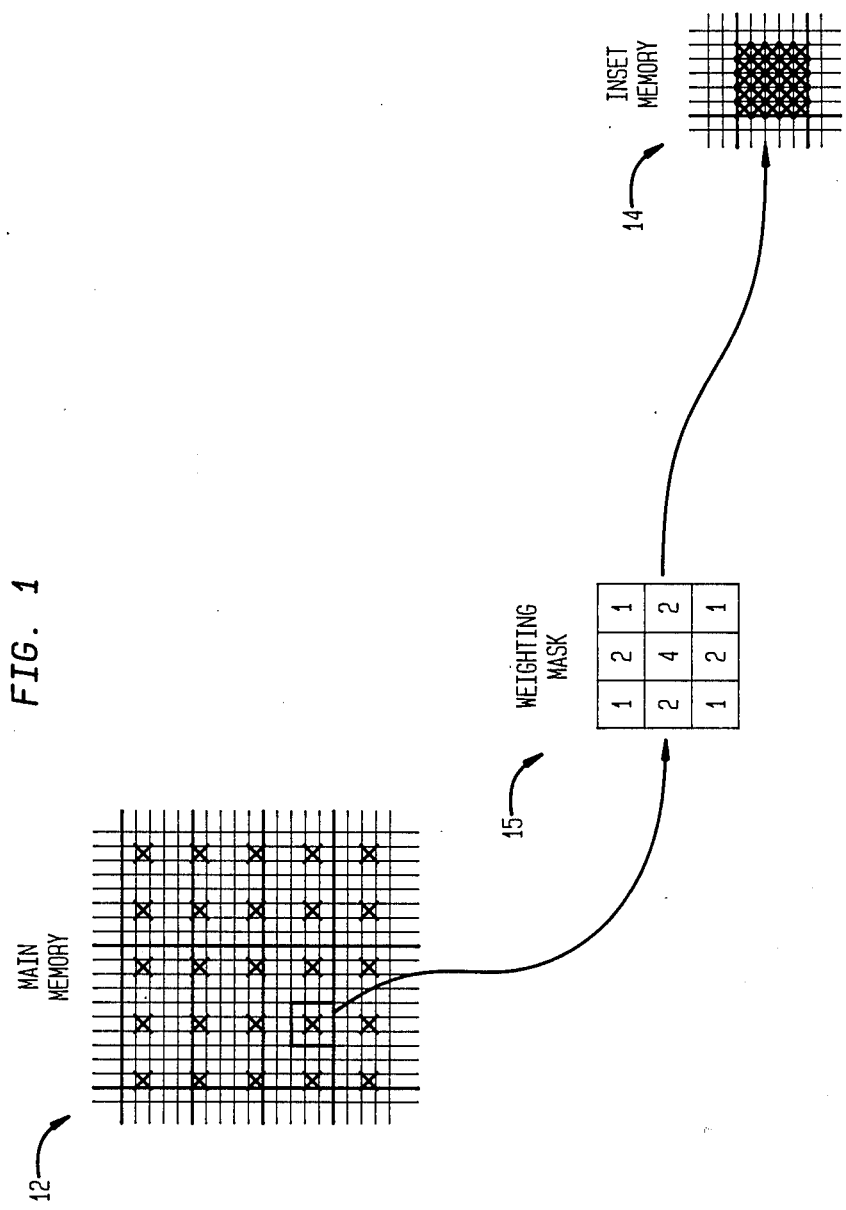
FIG. 1 schematically illustrates a method for shrinking and placing an image, which method may be used by a still frame image processing system, in accordance with an illustrative embodiment of the present invention.

Conceptually, given a digitized image arranged in a two-dimensional rectangular array, one can shrink this image simply by subsampling, that is by choosing only every Mth pixel vertically and horizontally. When these samples are placed adjacent to one another in a new array, a smaller representation of the original image is obtained. This is shown in FIG. 1, where the main and inset memory arrays 12 and 14 are represented by grids. Each small box represents one pixel. The X's represent the subsampled pixels, which are taken from the main memory and placed in adjacent cells in the inset memory. In the example of FIG. 1, the reduction factor M is equal to four. Alternatively, an image may be reduced by a factor M in one dimension and a different factor N in the other dimension.

There are two problems with this simple approach. First, if the original image has fine detail, some of this detail may be missed entirely by the subsamples and thus be completely lost. Second, shrinking an image in the spatial domain implies expanding the corresponding spatial frequency domain of that image. As a result, the shrunken image may contain too few samples for this expanded spatial frequency content. In this case, the Nyquist criterion, which states that an image must be sampled at a rate at least twice as high as its highest spatial frequency, is violated. Violation of this criterion may lead to aliasing effects, such as moire patterns or other undesirable visual artifacts in the shrunken image.

Both of these problems may be overcome by filtering the original image before it is subsampled. The image is low pass filtered to limit its spatial frequency content such that the shrunken image will satisfy the Nyquist criterion. This reduction in high frequency content also ensures that fine detail will be sufficiently spread out so that it will appear in at least some of the subsamples.

The image composing system of the present invention uses a somewhat simplified procedure. Filtering before sampling requires that every pixel in the original image be processed, a time consuming operation. Thus in the system of the present invention the pixels to be subsampled are chosen first . Then, the pixels in a 3×3 neighborhood surrounding each chosen pixel are used to calculate a weighted average value which determines the output pixel. In FIG. 1, the neighborhood is indicated by a box surrounding a selected pixel in the main memory. Each pixel in that neighborhood is multiplied by the appropriate weighting value shown in the weighting mask 15. The weighted samples are summed, then divided by the sum of the weights (16) to form the new pixel that is then placed in the appropriate place in the inset memory 14. This is done separately for each of the selected subsamples from the main memory. As is discussed below, the entire shrinking process is carried out separately for each of the primary colors, i.e, red, green, and blue.

The weights and sum of the weights are all of the form $2^n$ so that multiplications and divisions can be replaced by simple left and right shifts. This operation approximates a two-dimensional Gaussian low pass filter. However, only the selected pixels are actually processed. This speeds up the filtering, especially for large M.

Figure 2:
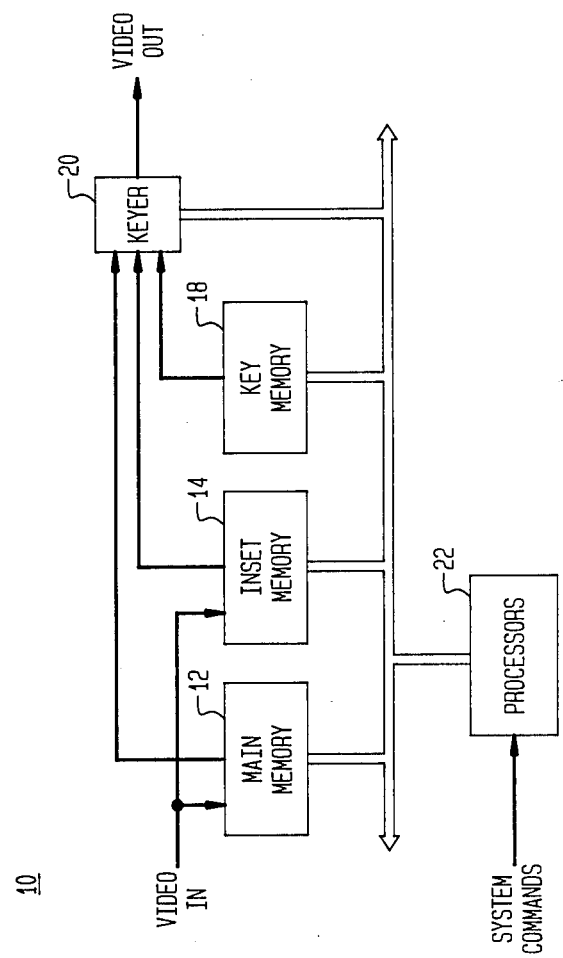
FIG. 2 schematically illustrates an architecture for a still frame image processing system in accordance with an illustrative embodiment of the present invention.

Turning to FIG. 2 the overall architecture of a still frame image processing system 10 is illustrated. The system is capable of composing multiple still image displays in near real time. The image processing system 10 is intended to be placed in series between a video image source and a display device such as a monitor.

The system of FIG. 2 comprises two video frame memories 12 and 14. Each of the memories 12 and 14 is capable of digitizing, storing and converting back to analog form one complete video frame (two fields). Memory 12 is designated the main memory in FIG. 2 and memory 14 is designated the inset memory.

In general, the main memory 12 is used to capture a new incoming image and the inset memory 14 is used to compose multiple image displays that are built up by shrinking one or more images from the main memory and placing them at specified locations in the inset memory. Typically, in an image shrinking operation, the user specifies an arbitrary source rectangle and an arbitrary destination rectangle. A subset of the pixels from the source are processed in the manner discussed above and placed into the destination. In this manner, a user may build up a new image in the inset memory 14 by repeated shrinking and placing of images from the main memory 12. Alternatively, one or more reduced size-images, stored in the inset memory, may be displayed as insets which are set into windows in the full sized image stored in the main memory.

Typically, the main and inset memories 12 and 14 each comprise three identical Datacube Inc. model VG-128 video memory boards, one for each primary color, red, green, and blue. In other words, there is a main red memory board, an inset red memory board, a main blue memory board, an inset blue memory board, a main green memory board, and an inset green memory board. Each memory board digitizes its component color with a resolution of 485 lines with 384 samples per line. Each sample is 8 bits deep.

The key memory 18 is used to store a bit map for defining windows, which windows are used by the keyer 20 to form multi-image displays. The keyer 20 is a high speed three channel analog switch. Following the bit map in the keyer memory 13, the keyer 20 selects, on a pixel by pixel basis, samples from either the main or inset memories to be delivered to the output.

All operations of the multi-image display system 10 are controlled by the processors 22. The system 10 of FIG. 2 includes 4 processors. Illustratively each of the processors may be a Heurikon HK68 /M10 single board computer. One of the processors is designated the master and controls overall operation of the system 10. The other three are individually dedicated to one of the three primary colors. In other words, there is a "red" processor for controlling the "red" memory boards in the main and inset memories and similar "blue" and "green" processors. The main function of the "red", "blue", and "green" processors is to realize the shrink and place operations described above.

The discussion below provides more details of each functional block in the system 10. Before proceeding, it is useful to consider the overall operation of the system 10 of FIG. 2. Analog video, separated into red, green, and blue components, appears at the Video In port. System commands, in the form of ASCII coded strings, arrive at the System Commands port from other computers in the system. The master processor interprets these commands, and conditions the dedicated "red", "green" and "blue" computers to perform a designated operation such as the shrink and place operation discussed above. The "red", "green" and "blue" computers each cause the appropriate video memory board in the main memory to acquire, digitize, and store one frame of the incoming video signal. Once that is complete, each dedicated computer performs the designated shrink and place operation, using the weighted filtering process previously described. Pixel samples from each designated neighborhood in the main memory are moved into on-board memory, processed, and the resulting weighted average pixel is written into the appropriate place in the inset memory. While this is taking place, the master processor determines the location of the destination rectangle. It writes a bit map corresponding to this rectangle into the key memory 18. When the shrink and place operation is completed, the master processor activates the keyer 20. Using the bit map from the Key memory, the keyer 20 continuously selects pixels from the main and inset memories to form a multi-image display. The Video Out signal is a standard video signal (repeating at 30 frames/second) that can be viewed on an RGB video monitor. Note that, since the video memory boards convert the digitized video image back into analog form, the keyer is an analog switching device. In this example, the resultant signal seen by the user is a combination of the reduced size image stored in the inset memory and whatever full size image is stored in the main memory.

Figure 3:
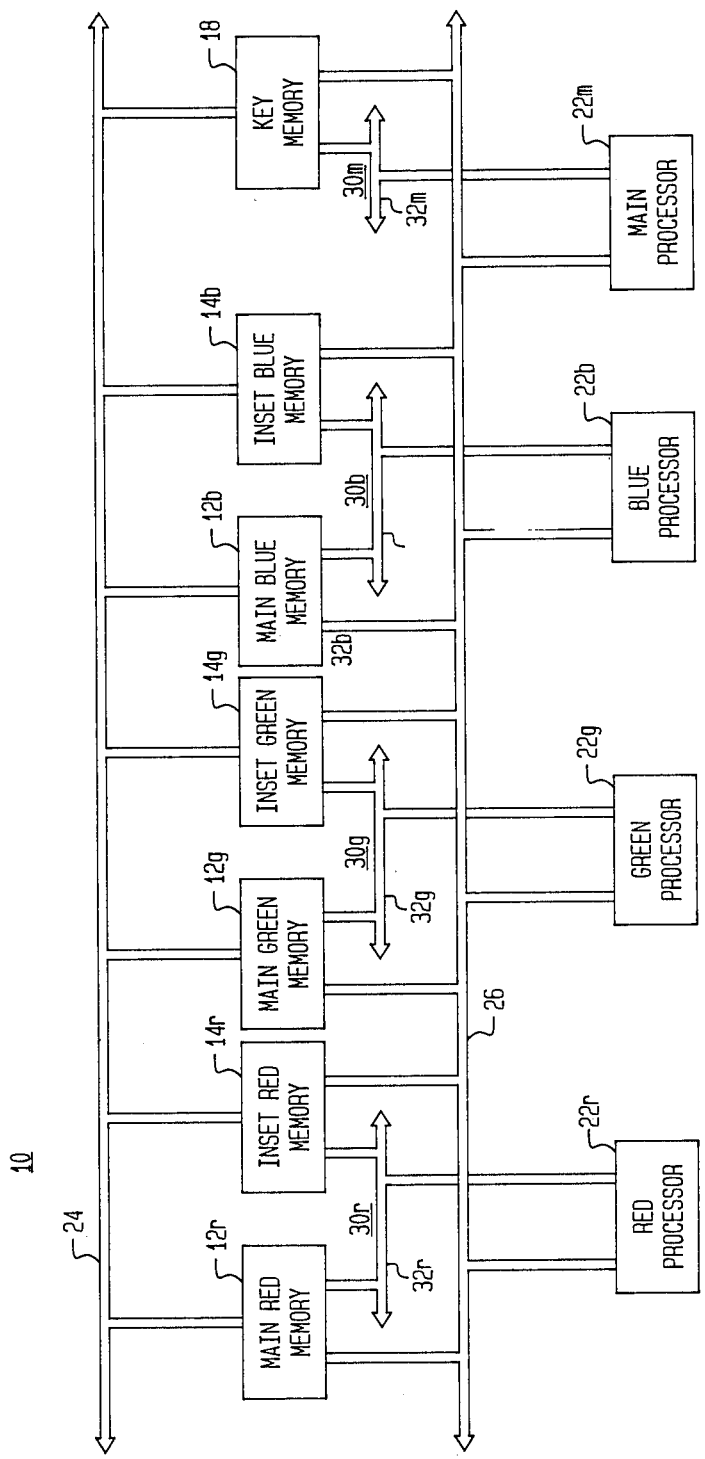
FIG. 3 illustrates the image processing system of FIG. 2 in greater detail.

FIG. 3 shows the still image processing system 10 of FIG. 2 in greater detail. The main memory 10 is shown comprising three color planes 12r, 12g, and 12b, for the three primary colors red, green, and blue. Similarly, the inset memory 14 is shown comprising three color planes 14r, 14g, and 14b. As indicated above, each of the memories 12r, 12g, 12b, 14r, 14g, and 14b may be implemented using a Datacube VG-128 Video memory board.

FIG. 3 shows four processors designated 22r, 22g, 22b, and 22m. Each of these processors may be implemented as a Heurikon HK68/M10 single board computer. Processor 22m is the master processor which controls overall operation of the system 10. Processor 22r controls the main red and inset red memories 12r and 14r. Similarly, processors 22g and 22b control the green memories 12g, 14g, and blue memories 12b, and 14b, respectively. As indicated above, the main task of the red, blue and green processors 22r, 22g, and 22b is to perform the shrink and place operations described above.

Video timing for the entire still image processor 10 is ensured by connecting all video memory boards together via the LOCKBUS 24. One board, for example the main green memory board 12g, is designated the timing master. External video synchronizing signals (not shown) are supplied to the timing master board. Circuitry on this board derives all timing signals necessary to control board functions. These timing signals are delivered to all other boards (designated timing slaves) via the LOCKBUS 24. As a result, all video input, output, sampling, and memory activity is synchronized on a pixel by pixel basis for the main and inset memory boards 12r, 12g, 12b, 14r, 14g, 14b, and keyer memory 18.

Every computer board 22r, 22g, 22b, and 22m can access every other computer or memory board via the main system bus 26, which illustratively is a MULTIBUS. (MULTIBUS is a trademark of Intel Corporation.) In particular, this allows the master processor to initialize all hardware and provides a basis for overall control via shared memory.

The image processing system 10 may be viewed as comprising four sections designated 30m, 30r, 30g, and 30b in FIG. 3. Section 30m comprises the key memory 18, and main processor 22m. Section 30r comprises the red memory boards 12r and 14r and the dedicated red processor 22r. Similarly, section 30g comprises the green memory boards 12g and 14g and the dedicated green processor 22g. Section 30b comprises the blue memory boards 12b and 14b and the dedicated blue processor 22b. Each of the sections 30r, 30g, 30b, 30m is interconnected with its own private bus 32r, 32g, 32b, 32m which are iLBX buses. (iLBX is a trademark of Intel Corporation.) Since these buses are physically separate, processing within each section can proceed simultaneously without contention or interference. This feature is important for the high speed performance of the still image processing system. For example, once commanded by the master processor, each color processor performs a shrink and place operation concurrently with the other processors. Each can read and write its associated color memories without contention from the others.

Figure 4:
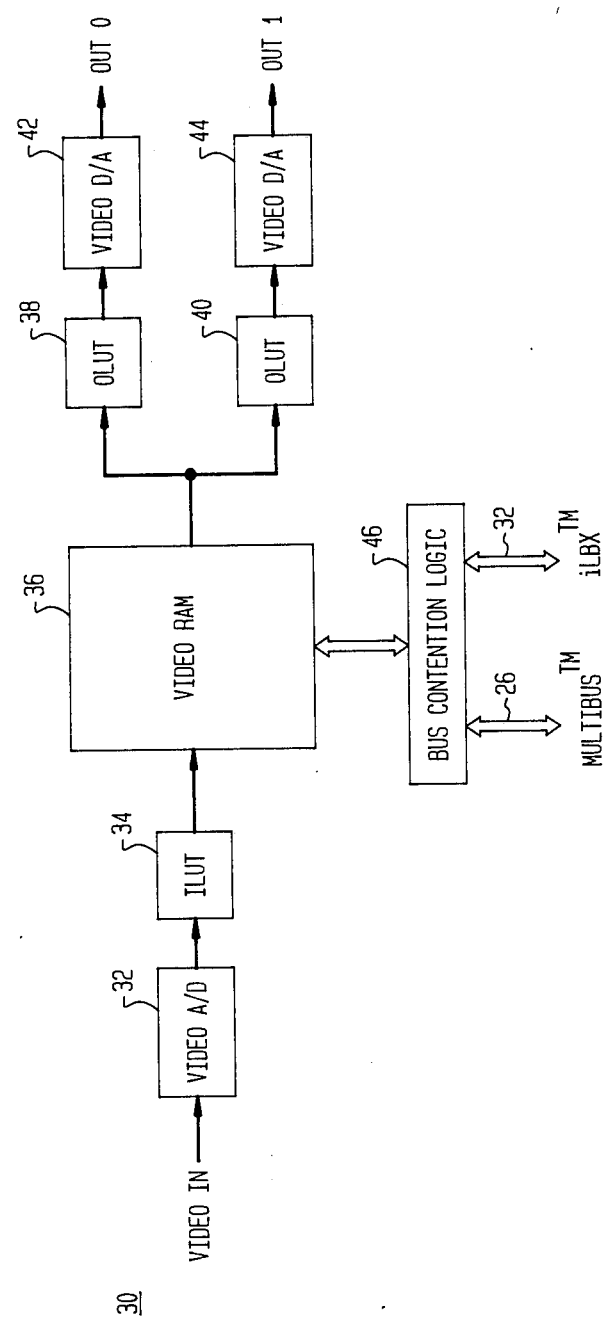
FIG. 4 schematically illustrates a video memory board which may be used in the image processing system of FIGS. 2 and 3.

FIG. 4 shows the major functional blocks of the commercially available Datacube VG-128 video memory board 30. Incoming analog video is digitized by the 8 bit video a/d (analog to digital) converter 32. The digitized samples are passed through an input look up table 34 (ILUT) which permits an arbitrary mapping of the samples. The table 34 can be used to do some signal processing of the input signal, for example to perform contrast correction. The transformed samples are then stored in the 192 Kbyte video ram 36. This is a conventional dynamic solid-state memory circuit, with addressing controlled by the video synchronizing signals. Digitizing of the input and filling of the Video RAM are done only upon external command, using control circuits that are not shown. The video RAM is continuously read out, video line by video line. Each output sample is directed to one of two output look up tables 38, 40 (OLUT's). (Actually the VG-128 video memory has three output look up tables but only two are used in the application described herein). As with the input look-up table 34, the output look-up tables 38, 40 permit an arbitrary mapping of the eight bit video samples. Typically, one is programmed to provide a linear transfer function (sample in=sample out), while the other is filled with a designated constant value (i.e. color). At the output of each output look-up table 38,40, is a video digital to analog converter 42, 44 which converts each digital signal to a standard video signal (with synchronizing information inserted by circuitry that is not shown). The VG-128 memory, as used in connection with the system 10 has two outputs 0 and 1, typically representing either the stored image or a constant color. These outputs are available to the keyer circuit 20 of FIG. 1. Control of all operations in the VG-126 memory board 40 is effected by writing control words into control registers (not shown) via the main bus 26 and bus control logic 46. The memory board 40 may be accessed by one of the dedicated private buses 32 as well as by the main bus 26.

Figure 5:
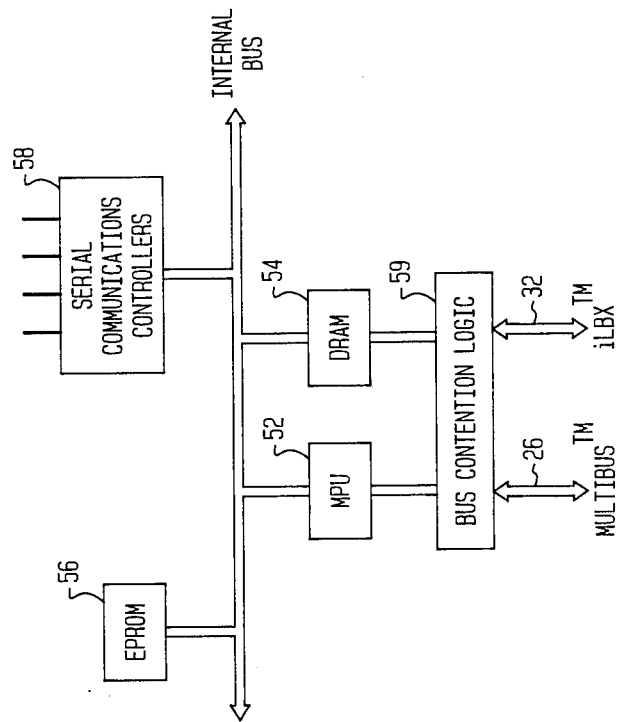
FIG. 5 schematically illustrates a single board computer which may be used in the image processing system of FIGS. 2 and 3.

FIG. 5 schematically illustrates the main elements of the commercially available Heurikon HK68/M10 single board computer 50. It is based on the Motorola 68010 microprocessor 52, running at 10 MHz. The board has 256K bytes of dynamic RAM 54 (designated DRAM) and up to 16K bytes of EPROM 56 which is used to store an onboard software executive program called the monitor. This program controls primitive computer operations, such as hardware initialization upon start up. It also provides a means to download operational programs into the DRAM for execution and to start and stop execution.

The computer board 50 provides serial communication line controllers 58, which can be used for the System Command input and for program downloading. Like the video memory boards discussed above, the single board computer 50 is accessed by the main bus 26. It may also be accessed by one of the private buses 32. Both buses interconnect with the computer by means of bus contention logic 59.

Figure 6:
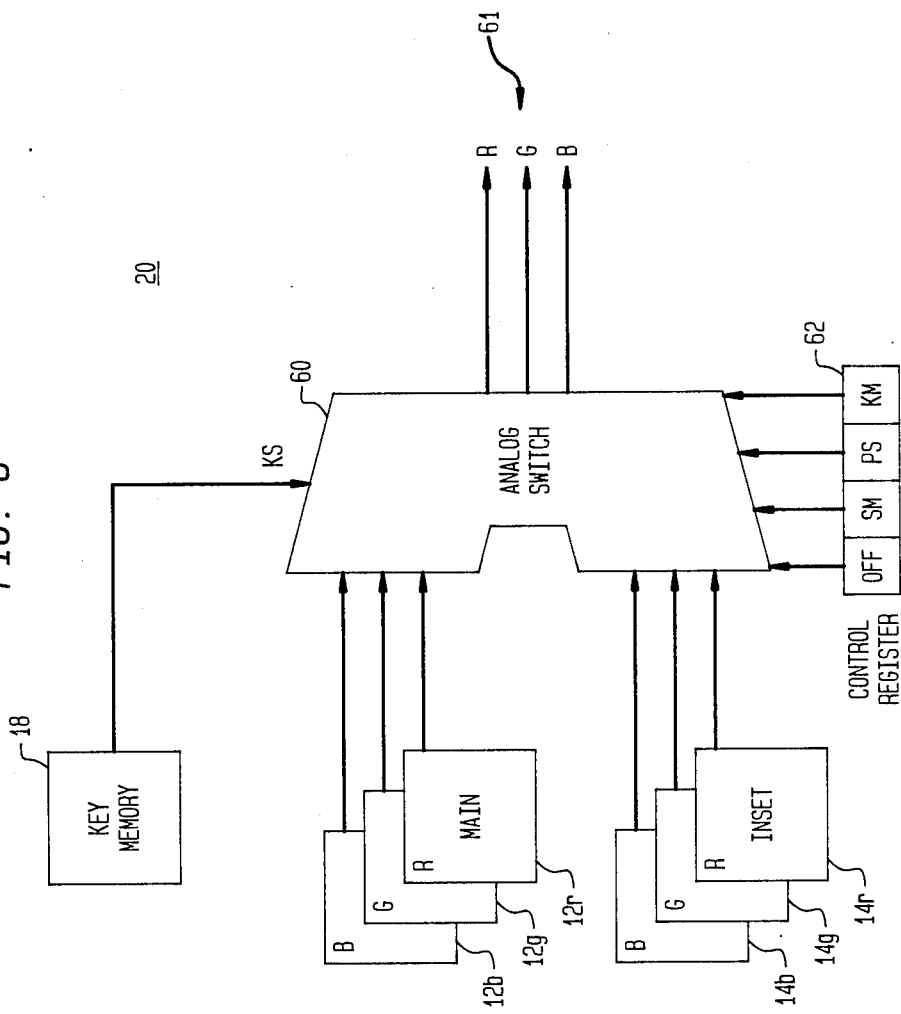
FIG. 6 schematically illustrates a keyer structure for use in the image processing system of FIGS. 2 and 3.

The keyer 20 is shown in more detail in FIG. 6. The keyer comprises a "three-pole, double-throw" analog switch 60. The three poles are controlled simultaneously, selecting red, green, and blue analog video signals from either the main red, green, and blue memories 12r, 12g, and 12b or the inset red, green, and blue memories 14r, 14g, and 14b. The selected signals are delivered to the red, green, and blue outputs 61. (Actually, as shown in FIG. 4, each memory board has two outputs so there is an additional level of selection to determine whether it is output 0 or output 1 that supplies the inputs.) The switch is controlled by digital logic (not shown) that is in turn controlled by the contents of a 4-bit control register 62. This register may be accessed by any of the processors in the system via the main bus. Typically, it is accessed by the main processor.

The four control bits operate as follows:
OFF turns the entire keyer off or on.
PS selects which path, 0 or 1, is used from each memory.
KM controls the keying mode. In static mode, the output comes entirely from either the Main or Inset memories 12, 14, as determined by the SM bit. In the keying mode, the output is switched between the main and inset memories on an individual pixel basis as determined by the state of the KS signal from the bit map in the key memory 18.

Figure 7:
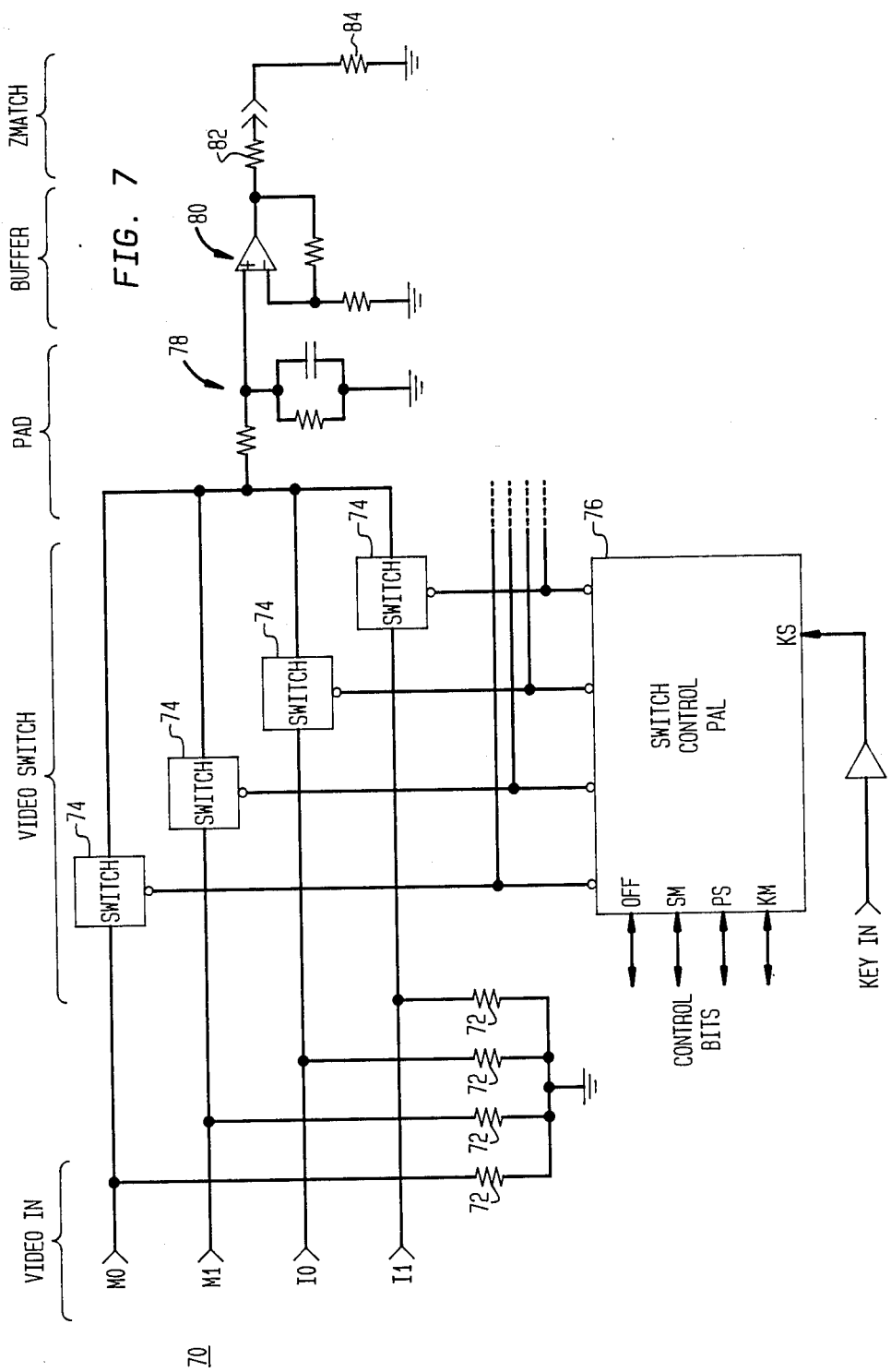
FIG. 7 schematically illustrates a keyer circuit which forms part of the keyer structure of FIG. 6.

FIG. 7 shows pertinent details of one pole 70 of the three pole analog switch 60. Thus, there is one pole 70 for each primary color, red, green, and blue. Analog video input signals from one of four sources, main or inset, path 0 or 1, are each terminated by a resistor 72 to provide, for example, a 75 ohm impedance. The path for each input signal has its own CMOS switch element 74. Illustratively, the four switches 74 are contained in one Harris HI-201HS integrated circuit. Each switch 74 provides a nominal 35 ohm ON resistance and 30 ns switching speed. The switches 74 are controlled by digital logic contained in a custom integrated circuit realized by one programmable array logic (PAL) device 76, (e.g., a Monolithic Memories 16R4 or equivalent). The logic 76 is arranged so that only one switch 74 is on at any one time. The selected signal is routed to a pad circuit 78, that provides a voltage gain of 0.2 and some "glitch" filtering. The pad output feeds a buffer amplifier 80 realized from a Harris HA-2540 operational amplifier with a gain of 10. The op amp output passes through an impedance matching resistor 82 (ZMATCH) to provide a 75 ohm output to drive the load which is typically a video monitor, represented by a load resistor 84. The impedance matching resistor 82 causes a voltage gain of 0.5. The pad circuit 78 is high impedance compared to the CMOS switches 74, so that the switches 74 insert negligible loss. Thus, the overall gain from input to output is $0.2 \times 10 \times 0.5 = 1.0$, or unity, and the input and output impedances are 75 ohms to match standard video requirements. Thus, this circuit approximates an ideal transparent switch with sufficient speed to switch video signals on a pixel by pixel basis. Because all video circuits are synchronized via the LOCKBUS arrangement of FIG. 3, control pixels read from the key memory correspond in time with the appropriate image pixels read from either the main or inset memories.

In short, the still image video processing system 10 provides two video memories 12, 14. A series of new images can be "grabbed" in one memory for examination by a system user without interfering with the contents of the other memory. This other memory can be used to store reduced size versions of frames that the user has indicated are of interest. The keyer 20 allows the user to select between the contents of either memory, or combinations thereof, without any destructive interference between them. Images can be inset into other images at will and removed when desired. The parallel bus structure 26, 32 supports true concurrent processing, allowing standard microprocessors to process video images at near real time speeds (a typical operation takes less than 0.5 seconds.) The simple command interface (i.e., the master processor 22m) allows the system 10 to be controlled by another computer, so it is easy to integrate the system into a distributed video delivery system.

Finally, the above described embodiments of the invention are intended to be illustrative only. Numerous alternative embodiments may be devised by those skilled in the art without departing from the spirit and the scope of the following claims.

What is claimed is:

1. A still image video processing system comprising first and second video memory means each capable of storing a single frame video image,
processing means for shrinking an image stored in said first memory means and storing it at a selected location in said second memory means, and
combining means capable of selectively transmitting the contents of said first memory means and the contents of said second memory means to form a multiple still image display, said combining means comprising a key memory for storing a bit map and a key switch, said key switch operating under control of said bit map stored in said key memory to selectively transmit the contents of said first and second memory means to form said multiple still image display.

2. The system of claim 1 wherein said first memory means comprises first red, blue, and green memories, and said second memory means comprises second red, blue, and green memories.

3. The apparatus of claim 2 wherein said processing means comprises a master processor and separate red, blue and green processors.

4. The apparatus of claim 3 wherein said system further includes
 a first dedicated bus for inter-connecting said first and second red memories and said red processor,
 a second dedicated bus for inter-connecting said first and second blue memories and said blue processor,
 a third dedicated bus for inter-connecting said first and second green memories and said green processor,
 a fourth dedicated bus for inter-connecting said master processor and said key memory, and
 a main system bus inter-connecting all of said memories and all of said processors.

5. The system of claim 4 wherein each of said memories comprises a single board memory.

6. The system of claim 4 wherein each of said processors comprises a single board computer.

7. The system of claim 1 wherein said key switch comprises a three pole analog switch.

8. A still image video processing system comprising,
 first and second video memory means, each capable of storing a single frame video image,
 processing means for shrinking an image stored in said first memory and storing a resulting reduced size image at a selected location in said second memory, and
 combining means capable of selectively transmitting the contents of said first memory, the contents of said second memory, or a combination of the contents of said first and second memories,
 said combining means comprising a key memory for storing a bit map and a key switch, said key switch operating under control of siad bit map sotred in said key memory to selectively transmit the contents of said first and second memories.

9. The still image video processing system of claim 8, wherein said bit map stored in said key memory defines a window, said key switch causing the reduced size image stored in said second memory to be displayed as an inset defined by said window in a full sized image stored in said first memory.

10. The image processing system of claim 8 wherein
 said processing means is adapted to shrink a sequence of images successively stored in said first memory means and store the resulting reduced size images at selected locations in said second memory, and
 said combining means is adapted to transmit the contents of said second memory thereby composing a multiple still image display.

11. A still image processing system comprising,
 first and second video memory means, each of said memory means including dedicated red, green, and blue memory portions, said first and second memory means each being adapted to receive a video frame comprising, red, green, and blue analog signals and to digitize and store said red, green, and blue signals in the corresponding red, green, and blue memory portions,
 red, green, and blue processors and red, green, and blue dedicated buses for interconnecting said red, green, and blue processors with said red, green, and blue memory portions in said first and second memory means, respectively, each of said red, green, and blue processors being adapted to simultaneously subsample data from the interconnected memory portion in said first memory and to store the subsampled data at a selected location in the interconnected memory portion of said second memory,
 a key memory for storing a bit map, and
 a switch operating under control of said bit map stored in said key memory for selectively transmitting the contents of said first memory means and said second memory means to a monitor to form a multi-image display comprised of images stored in said first and second memory means.

12. A method for forming a video display comprising a plurality of still images, said method comprising the steps of,
 storing a first video image in a first video memory,
 shrinking said first video image and storing the resulting reduced sized image at a selected location in a second video memory,
 storing a second video image in said first memory, and
 under control of a bit map stored in a key memory, selectively transmitting the contents of said first and second memories so that said reduced size image stored in second memory appears as an inset in the image stored in said first memory.

13. The method of claim 12 wherein said shrinking step further comprises the step of
 selecting every Mth pixel in the image to be reduced in size, and
 calculating a weighted average of the pixels in a predetermined neighborhood surrounding each selected pixel, and storing each resulting average pixel at an appropriate location in said second memory.

14. The method of claim 13 wherein said neighborhood is three pixels by three pixels.

* * * * *